United States Patent [19]

Grender et al.

[11] 4,446,626

[45] May 8, 1984

[54] METHOD AND APPARATUS FOR ACCURATELY SETTING DIRECTIONAL HEADINGS IN MINING TUNNELS

[76] Inventors: Arnemann Grender, Franklin, Minn. 55333; George F. Johnson, Jr., Rte. 4, Box 484-H, Pikeville, Ky. 41501

[21] Appl. No.: 367,587

[22] Filed: Apr. 12, 1982

[51] Int. Cl.³ ............................................. G01C 15/00
[52] U.S. Cl. ......................................... 33/286; 33/299; 33/DIG. 21; 248/328
[58] Field of Search .............. 33/1 H, 1 LE, 228, 263, 33/275 R, 286, 299, 398, DIG. 21; 248/322, 323, 328

[56] References Cited

U.S. PATENT DOCUMENTS

| | | | |
|---|---|---|---|
| 1,081,829 | 12/1913 | Higgins | 33/275 R |
| 2,376,700 | 5/1945 | Kinney | 33/263 |
| 2,828,097 | 3/1958 | Faunce | 248/328 |
| 3,042,355 | 7/1962 | Stevens | 248/328 |
| 3,057,074 | 10/1962 | Sidwell | 33/288 |
| 3,321,248 | 5/1967 | Williamson et al. | 299/1 |
| 3,484,136 | 12/1969 | Colson | 299/1 |
| 3,488,854 | 1/1970 | Trice, Jr. | 33/46 |
| 3,533,700 | 10/1970 | Alexander | 356/138 |
| 3,588,249 | 6/1971 | Studebaker | 356/4 |
| 3,591,926 | 6/1971 | Trice, Jr. | 33/46 |
| 3,612,700 | 10/1971 | Nelson | 356/153 |
| 3,627,429 | 12/1971 | Jaenicke | 356/153 |
| 3,631,601 | 1/1972 | McNulty | 33/286 |
| 3,652,166 | 3/1972 | Bessko | 356/138 |
| 3,775,929 | 12/1973 | Roodvoets et al. | 52/747 |
| 3,817,624 | 6/1974 | Martin | 356/138 |
| 3,879,132 | 4/1975 | Myeress | 356/153 |
| 3,894,805 | 6/1975 | Middletown | 356/138 |
| 3,997,267 | 12/1976 | Met | 356/138 |
| 4,367,021 | 1/1983 | Nordgren et al. | 33/DIG. 21 |

FOREIGN PATENT DOCUMENTS 2253618  5/1974  Fed. Rep. of Germany ........ 33/286

*Primary Examiner*—Richard R. Stearns
*Attorney, Agent, or Firm*—Frost & Jacobs

[57] ABSTRACT

A laser transmitter is suspended from spads set in the ceiling of the mining tunnel to establish a visible light beam aligned with the desired directional heading of the tunnel. In a first embodiment, the laser transmitter is attached to a bar suspended by means of cables from the spads. In a second embodiment, the laser transmitter assembly is suspended by means of adjustable ball chains, and includes a slide plate for moving the housing in directions transverse to the light beam. The method and apparatus is usable with existing tunnel operations having spads already in place.

14 Claims, 5 Drawing Figures

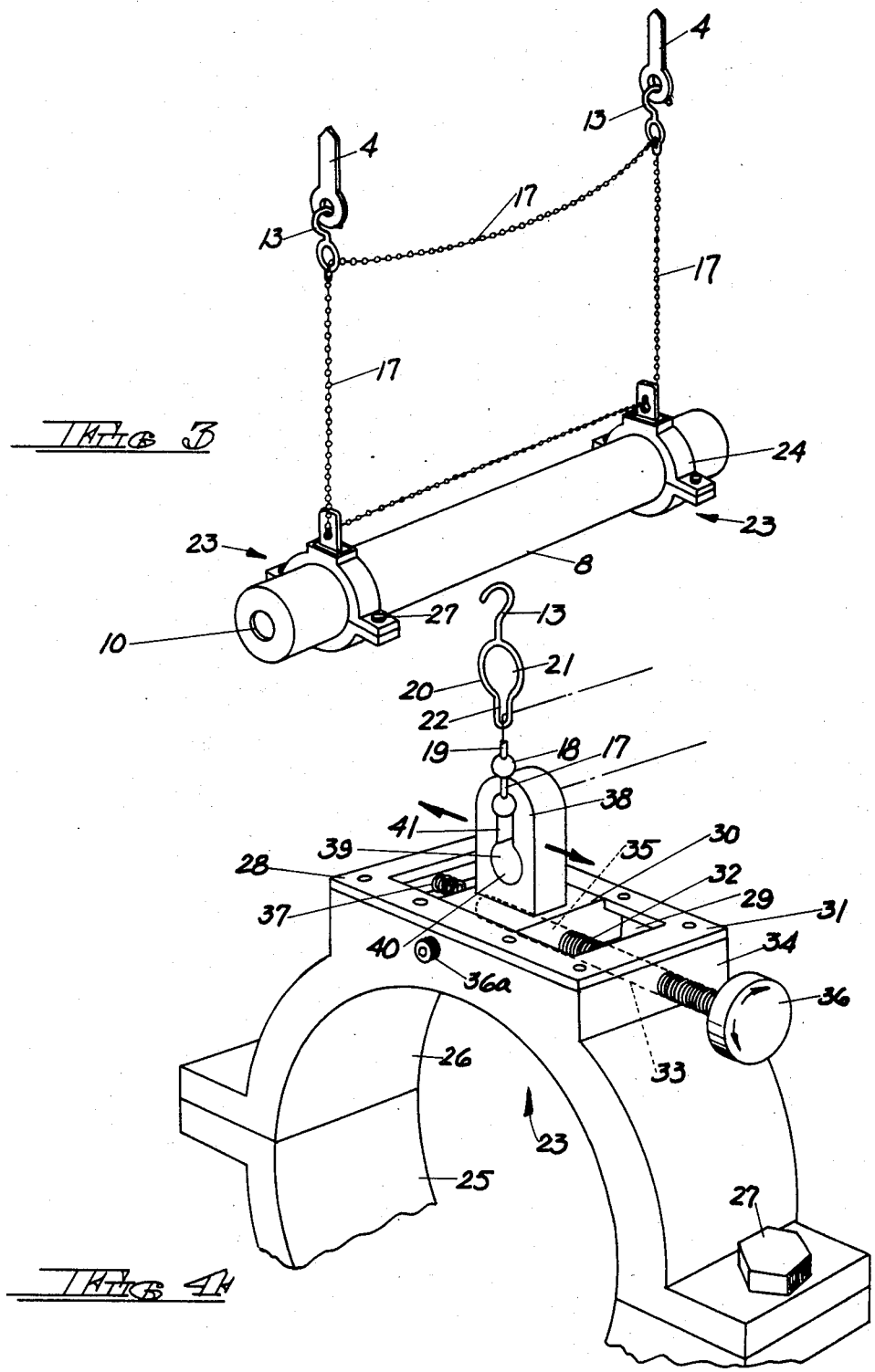

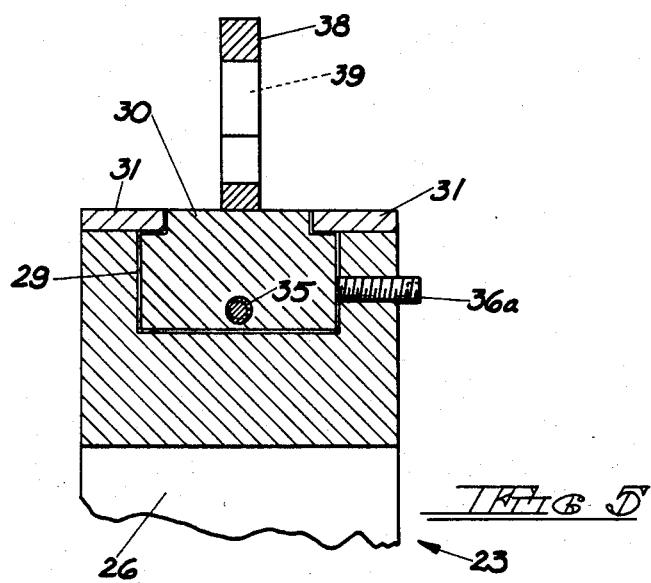

METHOD AND APPARATUS FOR ACCURATELY SETTING DIRECTIONAL HEADINGS IN MINING TUNNELS

SUMMARY OF THE INVENTION

The present invention is directed to an improved method and apparatus for establishing the directional headings, both in the horizontal and vertical planes in mining tunnels, particularly those associated with coal mining operations.

In conventional coal mining operations, it is not only desirable but often necessary to insure that the headings of the mining tunnels are accurately maintained and straight. This becomes particularly significant when a number of tunnels are driven parallel to each other at spacings of perhaps 50 feet, with the intervening unmined material forming support pillars.

In the usual coal mining operation, the headings of the tunnels are maintained by conventional surveying techniques which include placing a number of spads or metal rings in the mine ceiling from which plumb bobs are suspended. A visual sighting is then made along the strings of the plumb bob(s) in order to keep the alignment of the tunnel straight. It is well known that this operation requires at least two workmen and can be inaccurate and time consuming.

Several techniques have been suggested which use a laser transmitter for establishing a reference line for establishing the tunnel direction. For example, in U.S. Pat. No. 3,321,248, issued May 23, 1967 to T. N. Williamson et al., the laser is set on a tripod and directed toward a pair of targets. Plumb bobs suspended from the spads may be used as a vertical reference. It is found, however, that the telescope used in such an arrangement must be accurately aligned and positioned.

In U.S. Pat. No. 3,484,136 issued Dec. 16, 1969 to G. P. Colson, a laser may be suspended from the ceiling or attached to the floor. The laser beam is then directed to a pair of targets at a distance from the transmitter. Again, the mounting structure for the laser is relatively complex.

The apparatus used in the alignment method of the present invention is simple in construction and operation, yet permits the heading of the mining tunnel to be maintained with a high degree of accuracy. In the preferred embodiment, the metallic spads are set into the mine ceiling in the conventional way such that they are aligned to form a reference line representing the desired heading. Consequently, the present invention may be used in existing mines which already have the spads in place.

The apparatus includes a laser transmitter emitting a relatively thin monochromatic visible light beam and a generally cylindrical housing mounting the laser transmitter. While for purposes of an exemplary showing a laser producing a visible light beam is described and illustrated, any type of optical source producing a relatively narrow light beam may be used. The housing is suspended from the spads by means of cables or chains having hook-like hangers at one end which hook through the spads. The other ends of the cables or chains are connected at spaced locations along the length of the laser transmitter such that the light beam is accurately aligned with the reference lines to establish the desired directional heading.

In a first embodiment, the cables or chains are attached to an elongated bar-like member secured intermediate its ends to the upper portion of the laser transmitter housing and in axial alignment with the light beam. In a second embodiment, the transmitter is hung from the spads by means of a continuous ball chain bearing a plurality of spaced enlargements along its length which cooperate with a keyhole-shaped openings on the upper surface of the laser transmitter so that the vertical height of the assembly may be adjusted such that the direction of the light beam represents the desired slope of the tunnel. Means are also provided for moving the housing transversely of the light beam direction and also for pivoting the beam about a vertical axis. The present invention thus permits the laser transmitter to be freely suspended from the mining tunnel ceiling by means easily attachable thereto and detachable therefrom while providing a highly accurate indication of the desired direction of heading of the mining tunnel.

The light beam may be observed at a distance from the laser transmitter in order to establish a reference point for determining the desired directional heading. Alternatively, a right angle prism may be used to supply a reference point on the mine wall or ceiling on which additional spads may be placed.

Further features of the invention will become apparent from the detailed description which follows.

BRIEF DESCRIPTION OF THE DRAWING

FIG. 3 is a front and side perspective view of a second embodiment of the apparatus of the present invention.

FIG. 4 is a fragmentary front perspective view of the mounting structure of the embodiment of FIG. 3.

FIG. 5 is a fragmentary cross sectional view taken along the transverse center line of the apparatus illustrated in FIG. 4, as viewed toward thumb wheel 36.

DETAILED DESCRIPTION

Figure 1:
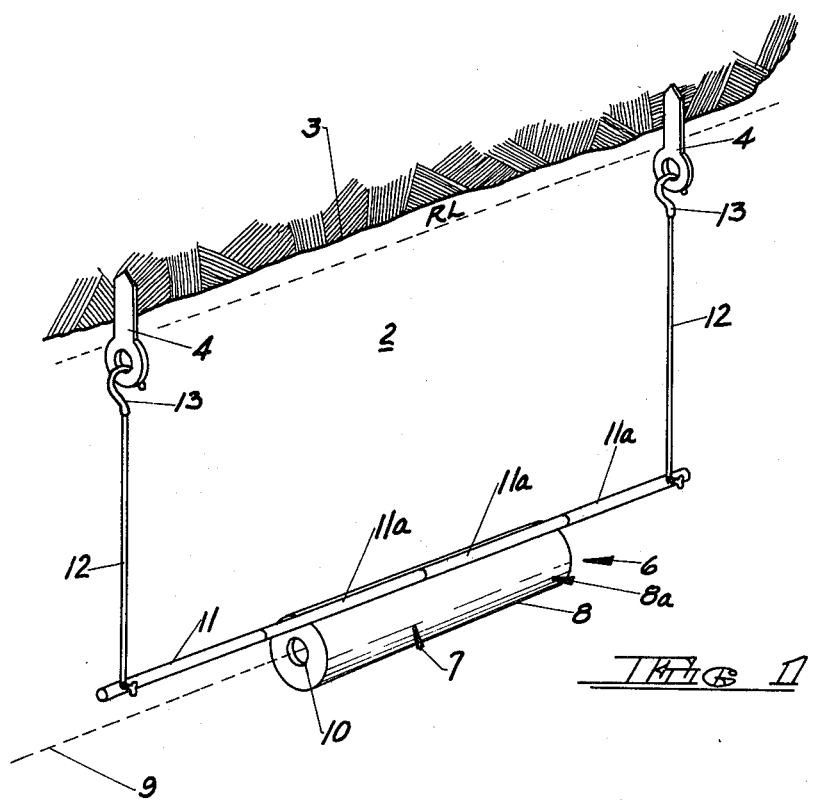
FIG. 1 is a perspective view of a first embodiment of the apparatus of the present invention in place in a typical mining tunnel.

As noted above, the present invention is designed for use in setting directional headings in a mining tunnel shown generally at 1 in FIG. 1 of the type having side walls, one of which is shown at 2, and a ceiling 3. The present invention finds particular utility in coal mining tunnels.

In such installations, it is customary to place in the tunnel ceiling a pair of metallic ring members 4, generally known as spads. Such spads contain a eyelet-like opening and a shank portion which can be driven into the ceiling. In the usual installation, the spads will be spaced apart a distance such that a plumb bob can be hung from each and a visual sighting taken along the strings to establish the tunnel heading direction. Furthermore, the spads are generally located in the center of the tunnel and in secure rock in the mine ceiling.

A first embodiment of the apparatus of the present invention is illustrated generally at 6 in FIG. 1 and includes a light source emitting a relatively narrow beam, and particularly a laser transmitter 7 mounted in an elongated generally cylindrical housing 8. Laser transmitter 7 may be of the helium-neon variety which emits a relatively thin monochromatic visible light beam 9 of characteristic red color. However, the wavelength of the light beam may also lie outside the visible spectrum. As is well known in the art, an opening or window 10 may be provided in the end of housing 8 for passing the light beam. For purposes of an exemplary showing, laser transmitter 7 and housing 8 may comprise a laser commonly sold for use on rifles under the name Laser-Lok by American Arms International. However, it will be understood that other types of relatively compact lasers, particularly of the self-contained power source variety, may also be utilized in connection with the present invention. Alternatively, a laser having a separate power source (not illustrated) may also be utilized.

It will be observed that spads 4 are set into tunnel ceiling 3 along a reference line designated RL which represents the desired tunnel heading.

The present invention also includes means for suspending housing 8 from spads 4 such that light beam 9 is accurately aligned with the reference line to establish the desired directional heading. In the embodiment illustrated in FIG. 1, this suspending means includes an elongated bar-like member 11 which is attached to the upper surface of housing 8 intermediate its ends in parallel alignment with light beam 9. An elongated flexible filamentary member 12 such as a cable, wire, cord, string or the like, is attached near each end of bar-like member 11. For purposes of an exemplary showing, filamentary member 12 will be described in terms of a flexible cable.

The upper end of each cable 12 is provided with a hook-like hanger 13 which hangingly cooperates with the opening in the associated spad 4 so that the entire assembly can be freely suspended from the spads. Consequently, as a result of the arrangement illustrated in FIG. 1, light beam 9 will be accurately aligned with reference line RL to establish a visible representation of the desired directional heading.

In the case where the Laser-Lok laser is used, transverse adjustment of the laser beam may be made via alignment screws internal to that unit.

It will be observed that the apparatus is highly portable and rugged, and may be easily attached to and removed from existing or newly placed spads. Furthermore, if desired, bar-like member 11 may be made longer or shorter than housing 8, or may be made in several sections 11a, or may be made telescoping, to further increase the portability of the unit.

Figure 2:
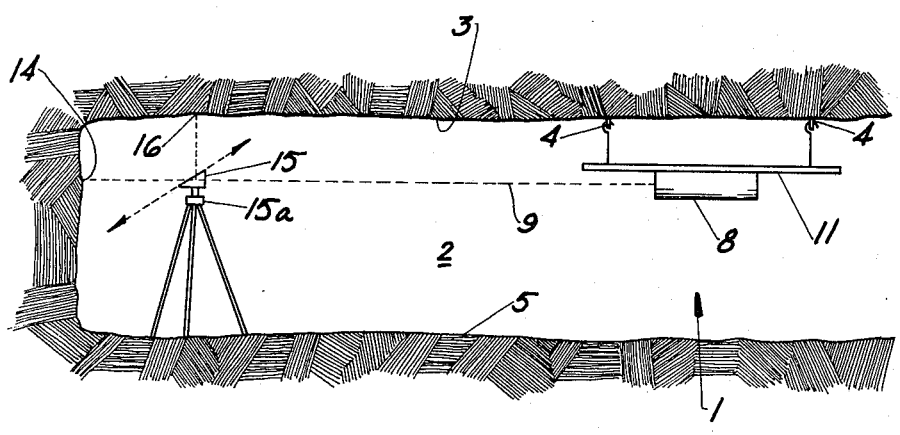
FIG. 2 is a fragmentary partially schematic side elevation view of the apparatus of FIG. 1.

The operation of the unit is illustrated schematically in FIG. 2. First, a pair of spads 4 is attached to ceiling 3 at spaced locations such that reference line RL extended through the spads accurately represents the desired tunnel heading. The laser transmitter is then suspended from the spads as described above so that light beam 9 is accurately aligned with the reference line. Reference line 9 is then observed at a distance from the laser transmitter 7 to establish a reference point for determining the desired directional heading. As illustrated in FIG. 2, the light beam may be observed on the face of the mine as at 14 prior to mining that area, in order to maintain the proper heading. Alternately, a right angle prism 15 on a floor-supported tripod 15a may be used to deflect light beam 9 at exactly a 90° angle to establish a reference point 16 on the tunnel walls or ceiling. This will accurately locate the transverse tunnels, or "breaks" in the mine. It will be observed that the light beam is thus visible when projected on a solid surface or in dust-laden air.

In the embodiment just described, it will be observed that the laser transmitter is suspended in such a way that it hangs freely beneath the tunnel ceiling. Furthermore, the lengths of cables 12 may be shortened or lengthened as desired to change the vertical orientation of the light beam, if desired. In many situations, it will be desirable to adjust the length of cables 12 such that light beam 9 is oriented substantially parallel in the vertical direction reference line RL at a desired height above the mine tunnel floor.

A second embodiment of the present invention is illustrated in FIG. 3–FIG. 5, where elements similar to those previously described have been similarly designated. In this embodiment the flexible cable 12 of the embodiment described above has been replaced by a flexible ball chain 17. As is well known, such ball chains comprise a plurality of spherical members or bulbous enlargements 18 (see FIG. 4) connected by thin rod-like members 19. Such a construction produces a chain-like member with a plurality of such bulbous enlargements positioned at spaced locations along its length.

The upper ends of ball chain 17 pass through a keyhole-shaped loop 20 formed in the lowermost end of hanger 13. Loop 20 includes an upper opening 21 dimensional to freely pass ball chain 17, and a lower opening 22 of narrower dimensions which operates to prevent passage of the bulbous enlargements 18 of the ball chain, thereby locking the chain in place. It will be observed that this construction permits the ball chain to be locked in a plurality of positions. Alternatively, the chains 17 may be solidly fixed to supports 38, allowing vertical adjustment at points 13 only.

Laser transmitter housing 8 is supported by a pair of mounting assemblies, shown generally at 23 positioned near each end of the housing as shown in FIG. 3 and in more detail in FIG. 4. It will be understood that the construction and operation of both assemblies is the same.

Mounting assembly 23 is attached to the outer surface of housing 8 by means of a split mounting ring 24 consisting of a lower half 25 and an upper half 26, which may be secured together with one side by threaded screw or bolt 27. The upper surface of the upper part 26 of the split mounting ring forms a slide block 28 including a channelway 29 extending transversely of the central axis of mounting assembly 23. A sliding member 30 is slidably restrained within channelway 29 and is held in place by means of cooperating shoulders 31 on the upper side edges of the channelway. It will be understood that this arrangement permits sliding member 30 to move in directions transverse to the longitudinal axis of laser transmitter 7, i.e. transverse to light beam 9.

Sliding member 30 is moved by means of a worm screw 32 which is rotatably supported in a bore 33 extending through one side end 34 of slide block 28, and which threadedly cooperates with a threaded bore 35 extending longitudinally into sliding member 30. The outermost end of worm gear 32 is provided with a hand operable thumb wheel 36. A locking Allen head screw 36a prevents accidental changes in the position of the slide block.

The opposite end of sliding member 30 is biased toward thumb wheel 36 by means of a compression spring 37. Consequently, it will be observed that when front wheel 36 is rotated in the appropriate direction, sliding member 30 will move in a direction transverse to the longitudinal axis of the laser transmitter. Furthermore, if the sliding member 30 on the rear portion of the laser housing is caused to move in one direction, and the sliding member 30 on the front portion of the laser housing is caused to move in the opposite direction, the light beam will pivot about a vertical axis extending through the housing. If a laser tube embodying internal transverse adjustment is used, the sliding mechanism just described may be deleted.

A tab-like support 38 extends upwardly from the upper surface of sliding member 30, and is provided with a keyhole-shaped opening 39 extending therethrough in the direction of the longitudinal axis of the laser transmitter. Keyhole-shaped opening 39 includes a lower opening 40 which is dimensioned to pass ball chain 17. An upper opening 41 is also provided of narrower dimension which prevents the passage of the enlargements 18 of the chain in order to permit the chain to be locked in a plurality of positions.

The operation of this embodiment is similar to that previously described in connection with the embodiment of FIGS. 1 and 2. The housing 8 is suspended from the spads 4 by means of ball chain 17 which passes through loops 20 in the bottom ends of hangers 13 and through opening 39 in tab-like support 38. As noted, the narrow openings 22 and 41 permit the ball chain to be locked at a plurality of positions so that not only the vertical height, but also the inclination of the laser transmitter 7 may be adjusted, such as to conform to the slope of the mine tunnel, for example. In addition, thumb wheel 36 may be adjusted to move housing 8 in a sideways direction. Consequently, the present invention includes means for adjustably moving the laser transmitter and associated hanging means in directions transverse to the light beam both in the horizontal and vertical direction. It will be further understood that ball chain 17 may comprise a continuous chain-like member, or may be provided as separate ball chains for separately suspending each end of the laser transmitter housing.

It will be understood that changes in the details, steps, materials and arrangements of parts, which have been herein described in order to explain the nature of the invention, may be made by those skilled in the art within the principal and scope of the invention as expressed in the appended claims.

The embodiments of the invention in which an exclusive property or privilege is claimed are as follows:

1. Apparatus for accurately setting directional headings in a mining tunnel of the type having side walls and a ceiling including a pair of spads attached to the ceiling along a reference line representing the desired heading, each of said spads having an eyelet-like opening, said openings being aligned along a line-of-sight establishing the desired heading, said apparatus comprising:
   a light source comprising a laser transmitter emitting a relatively thin substantially monochromatic beam of visible light;
   an elongated housing mounting said light source;
   a pair of hanging means positioned at spaced locations on the upper surface of said light source housing for lockingly engaging a ball chain; and
   an elongated length of flexible ball chain composed of a plurality of spaced bulbous enlargements connected by thin rod-like members and having a portion lockingly cooperating with each of said hanging means and a portion held by a hook-like hanger for hangingly cooperating with each spad opening so that said housing is suspended from the spads such that said light beam is accurately aligned with said reference line to establish the desired directional heading.

2. The apparatus according to claim 1 including means for changing the length of said ball chain to vary the vertical orientation of said light beam.

3. The apparatus according to claim 1 wherein said ball chain is of such a length that said light beam is oriented substantially parallel in the vertical direction to said reference line.

4. The apparatus according to claim 1 including an elongated bar-like member attached to the upper surface of said housing intermediate its ends in axial alignment with said light beam, said hanging means being attached at spaced locations to said bar-like member.

5. The apparatus according to claim 1 wherein said hanging means includes a keyhole-shaped opening having a first opening dimensioned to pass said ball chain enlargements and a second opening dimensioned to prevent the passage of said enlargements, said ball chain passing through said keyhole-shaped opening.

6. The apparatus according to claim 1 wherein said ball chain comprises a single continuous chain-like member.

7. The apparatus according to claim 1 wherein the lowermost end of each of said hangers includes an eyelet-like opening, said ball chain passing through and lockingly cooperating with said opening.

8. The apparatus according to claim 7 wherein said eyelet-like opening comprises a keyhole-shaped opening having an upper opening dimensioned to pass said enlargements and a lower opening dimensioned to prevent the passage of said enlargements, said ball chain passing through said keyhole-shaped opening in said hanger.

9. The apparatus according to claim 1 including means for adjustably moving said hanging means in directions transverse to said light beam.

10. The apparatus according to claim 9 wherein said hanging means comprises a tab-like support extending upwardly from the upper surface of said housing, said tab including a keyhole-shaped opening having a lower opening dimensioned to pass said enlargements and an upper opening dimensioned to prevent the passage of said enlargements, said ball chain passing through said keyhole-shaped opening, said tab-like support being slidably received in a channelway extending transverse to the light beam, said adjustable moving means comprising a hand operable worm gear threadedly cooperating with said tab to move the tab in either direction along the channelway.

11. The apparatus according to claim 10 including an adjustable moving means located at either end of said housing, adjustment of said tab-like support in opposite directions transverse to the light beam causing pivotal movement of the light beam about a vertical axis.

12. The apparatus according to claim 1 including means for adjusting the direction of said light beam in the vertical direction.

13. The apparatus according to claim 1 including means for adjusting the direction of said light beam in the horizontal direction.

14. The apparatus according to claim 13 including means for pivoting said light beam about a vertical axis.